(12) United States Patent
Laperriere, III et al.

(10) Patent No.: US 9,701,230 B2
(45) Date of Patent: Jul. 11, 2017

(54) HEADREST ASSEMBLY FOR A VEHICLE SEAT

(71) Applicant: Kongsberg Automotive, Inc., Novi, MI (US)

(72) Inventors: Joseph M. Laperriere, III, Chesterfield, MI (US); Douglas J. Wheeler, Farmington Hills, MI (US); Sai Pedaballe, Clawson, MI (US); Cha Xiong, Warren, MI (US); Brian D. Cabble, Berkley, MI (US)

(73) Assignee: CNI Enterprises, Inc., Oak Park, MI (US)

( * ) Notice: Subject to any disclaimer, the term of this patent is extended or adjusted under 35 U.S.C. 154(b) by 92 days.

(21) Appl. No.: 14/747,632

(22) Filed: Jun. 23, 2015

(65) Prior Publication Data

US 2015/0367764 A1 Dec. 24, 2015

Related U.S. Application Data

(60) Provisional application No. 62/015,901, filed on Jun. 23, 2014.

(51) Int. Cl.
*B60N 2/48* (2006.01)
(52) U.S. Cl.
CPC .................. *B60N 2/4847* (2013.01)
(58) Field of Classification Search
CPC ................. B60N 2/4847; B60N 2/48
USPC ........................................................ 297/408
See application file for complete search history.

(56) References Cited

U.S. PATENT DOCUMENTS

| 4,674,797 | A | 6/1987 | Tateyama |
| 5,238,295 | A | 8/1993 | Harrell |
| 5,364,164 | A | 11/1994 | Kuranami |
| 5,964,505 | A | 10/1999 | Koenig et al. |
| 6,000,760 | A | 12/1999 | Chung |
| 7,152,927 | B1 | 12/2006 | Halstrom |
| 7,677,658 | B2 | 3/2010 | Choi |
| 8,979,203 | B1 * | 3/2015 | Sutter, Jr. ............. B60N 2/4844 297/408 |
| 9,050,917 | B2 * | 6/2015 | Tobata ................. B60N 2/4841 |

(Continued)

FOREIGN PATENT DOCUMENTS

| JP | 2013154798 A * | 8/2013 | .......... B60N 2/4841 |
| WO | WO 2007 073 034 A1 | 6/2007 | |

*Primary Examiner* — Milton Nelson, Jr.

(57) ABSTRACT

A headrest assembly for a vehicle seat. The headrest assembly includes a support bracket having a first engagement section and a moveable bracket movable between first and second positions. The headrest assembly further includes a pawl defining a cam surface. The pawl has a second engagement section and is pivotable between an engaged position, with the second engagement section engaging the first engagement section, and a disengaged position, with the second engagement section spaced from the first engagement section. The headrest assembly further includes a first tab selectively engaging and guiding the pawl into the engaged position, and a second tab selectively engaging and guiding the pawl into the disengaged position as the moveable bracket moves between the first and second positions. The headrest assembly further includes a biasing member engaging the cam surface to continuously bias the pawl into both of the engaged and disengaged positions.

22 Claims, 14 Drawing Sheets

(56) References Cited

U.S. PATENT DOCUMENTS

2011/0175421 A1\* 7/2011 Grable ................ B60N 2/4847
                                                                              297/408
2011/0221250 A1   9/2011 Little \* cited by examiner

HEADREST ASSEMBLY FOR A VEHICLE SEAT

RELATED APPLICATIONS

This application claims the benefit of U.S. Provisional Patent Application No. 62/015,901, filed Jun. 23, 2014, the entire contents of which are hereby incorporated by reference.

BACKGROUND OF THE INVENTION

1. Field of the Invention

The subject invention relates to a headrest assembly for a vehicle seat.

2. Description of Related Art

There is a desire within the transportation industry to provide a vehicle seat having an adjustable headrest. Headrests provide support to a user's head and help to prevent head and neck injury in the event of a collision. In order to best support and protect a user's head, the headrest must be able to adjust to configure to a particular user. Furthermore, adjustable headrests are desirable in vehicle seats that may be stowed away to provide additional cargo space. In one example, the headrest has a pivoting section and a fixed section with the fixed section coupled to a seatback of the vehicle seat and the pivoting section pivotally coupled to the fixed section. The headrest includes a first latch fixed to the fixed section and a second latch movably coupled to the pivoting section. The second latch selectively engages the first latch to fix the pivoting section relative to the fixed section. The headrest includes an actuator, such as push button visibly disposed on the headrest, with the actuator capable of moving the second latch into and out-of engagement with the first latch to facilitate selectively fixing the pivoting section relative to the fixed section.

While the headrest is adjustable, the first and second latches only allow for one fixed position for supporting the user's head. Further, the actuator visibly disposed on the headrest may be aesthetically unappealing to the user. Therefore, there remains an opportunity to develop an improved headrest for a vehicle seat.

SUMMARY OF THE INVENTION AND ADVANTAGES

The subject invention provides for a headrest assembly for a vehicle seat. The headrest assembly includes a support bracket adapted to be mounted to the vehicle seat with the support bracket having a first engagement section defined between a first end and a second end. The headrest assembly further includes a moveable bracket coupled to the support bracket for movement between a first position and a second position. The headrest assembly further includes a pawl pivotally coupled to the moveable bracket and defining a cam surface. The pawl has a second engagement section and is pivotable between an engaged position, with the second engagement section engaging the first engagement section for securing the moveable bracket to the support bracket in the first position, and a disengaged position, with the second engagement section spaced from the first engagement section for permitting movement of the moveable bracket relative to the support bracket between the first and second positions. The headrest assembly further includes a first tab coupled to and fixed relative to the support bracket. The first tab selectively engages and guides the pawl into the engaged position as the moveable bracket moves from the second position to the first position. The headrest assembly further includes a second tab coupled to and fixed relative to the support bracket. The second tab selectively engages and guides the pawl into the disengaged position as the moveable bracket moves from the first position to the second position. The headrest assembly further includes a biasing member coupled to the moveable bracket and engaging the cam surface of the pawl to continuously bias the pawl into both of the engaged and disengaged positions.

Accordingly, the headrest assembly facilitates adjustability of the headrest assembly. Specifically, the selective engagement of the second engagement section with the first engagement section allows for selectively retaining the movable brackets relative to the support bracket. Additionally, the continual biasing by the biasing member on the pawl in both the engaged and disengaged positions, in conjunction with the first and second tabs guiding the pawl into the engaged and disengaged positions, respectively, facilitates selectively retaining the movable bracket relative to the support bracket without requiring an aesthetically-unpleasing actuator that the user must actuate in order to selectively allow movement of the movable bracket relative to the support bracket.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
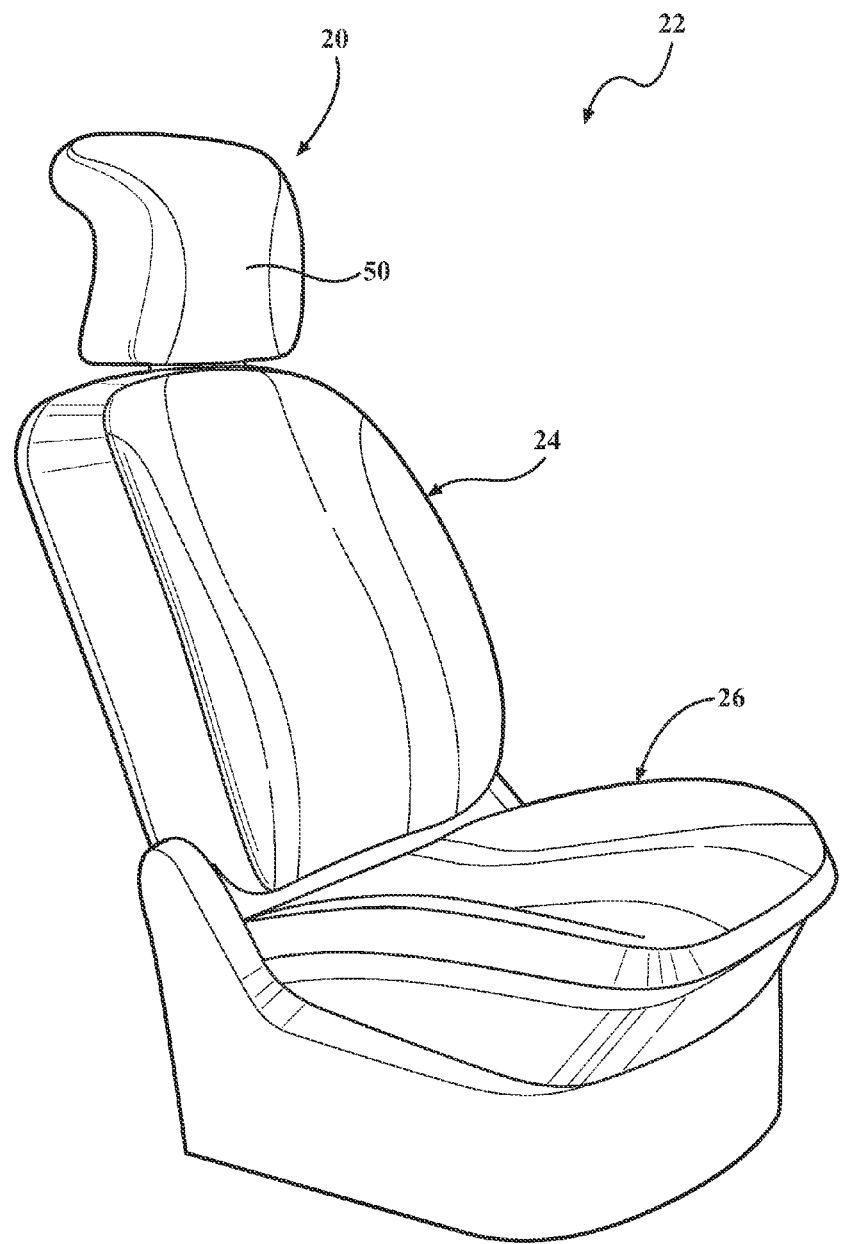
FIG. 1 is a perspective view of a vehicle seat and a headrest assembly.

Referring to the Figures, wherein like numerals indicates like or corresponding parts throughout the several views, a headrest assembly 20 for a vehicle seat 22 is generally shown in FIG. 1. The vehicle is typically a passenger car or a truck. However, it is to be appreciated that the vehicle may be any configuration for providing transportation. The vehicle seat 22 may include a back portion 24 and a bottom portion 26 transverse to the back portion 24. The back portion 24 may support a user's back, the bottom portion 26 may support a user's legs, and the headrest assembly 20 may support a user's head.

As shown in FIGS. 2, 3, 10, and 11, the headrest assembly 20 includes a support bracket 28 adapted to be mounted to the vehicle seat 22. More specifically, the support bracket 28 may be a pair of support brackets 28. The headrest assembly 20 may be coupled to the back portion 24 of the vehicle seat 22. The back portion 24 of the vehicle seat 22 may include a frame 30 with the support brackets 28 spaced from one another and fixed to the frame 30. It is to be appreciated that the support bracket 28 may be fixed to the frame 30 by welding, mechanical fasteners, or any other suitable configuration. It is also to be appreciated that the headrest assembly 20 may be coupled to any portion of the vehicle seat 22.

Figure 4:
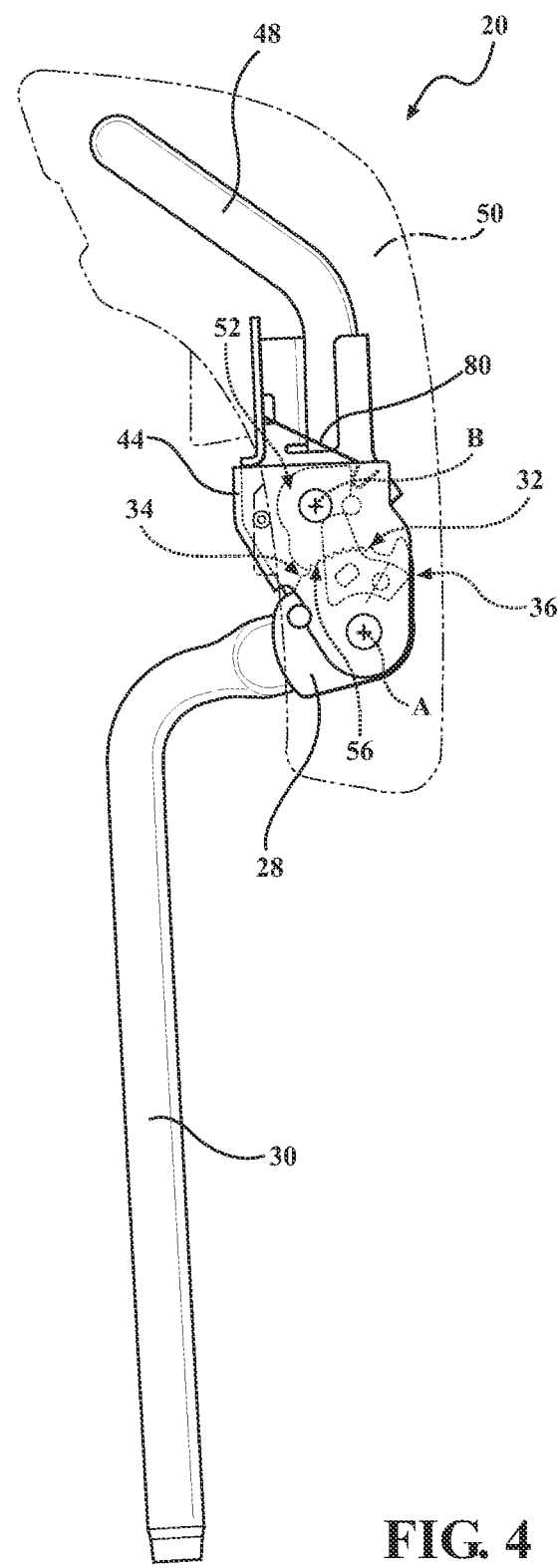
FIG. 4 is a side plan view of the headrest assembly including a cushion shown in phantom, with the headrest assembly coupled to the frame.
Figure 12:
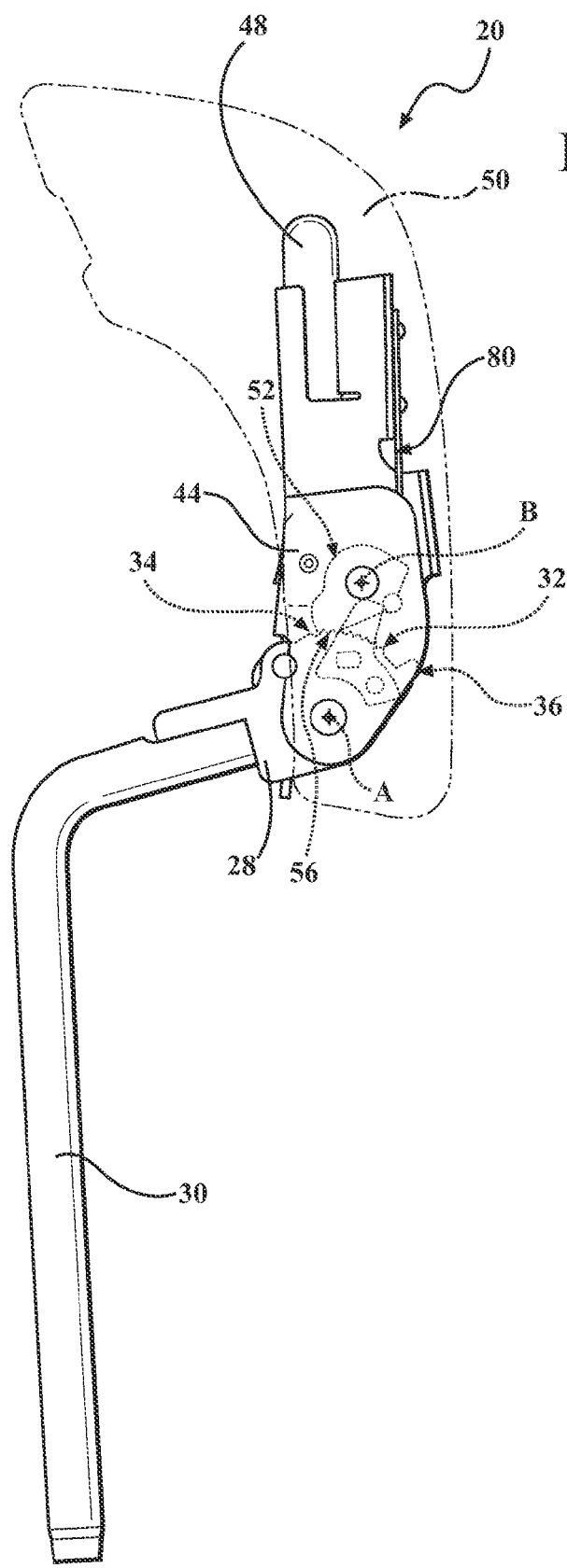
FIG. 12 is a side plan view of the headrest assembly including the cushion shown in phantom, with the headrest assembly coupled to the frame.

As shown in FIGS. 4 and 12, the support bracket 28 has a first engagement section 32 defined between a first end 34 and a second end 36. The first engagement section 32 is spaced from the frame 30. Furthermore, the first and second ends 34, 36 are spaced from one another with the first end 34 closer to the frame 30 than the second end 36. It is to be appreciated that the first and second ends 34, 36 may be disposed in any configuration. The first engagement section 32 is a single first engagement section 32 disposed along one of the pair of support brackets 28. It is to be appreciated that the first engagement section 32 may be disposed along both of the pair of support brackets 28.

Figure 5:
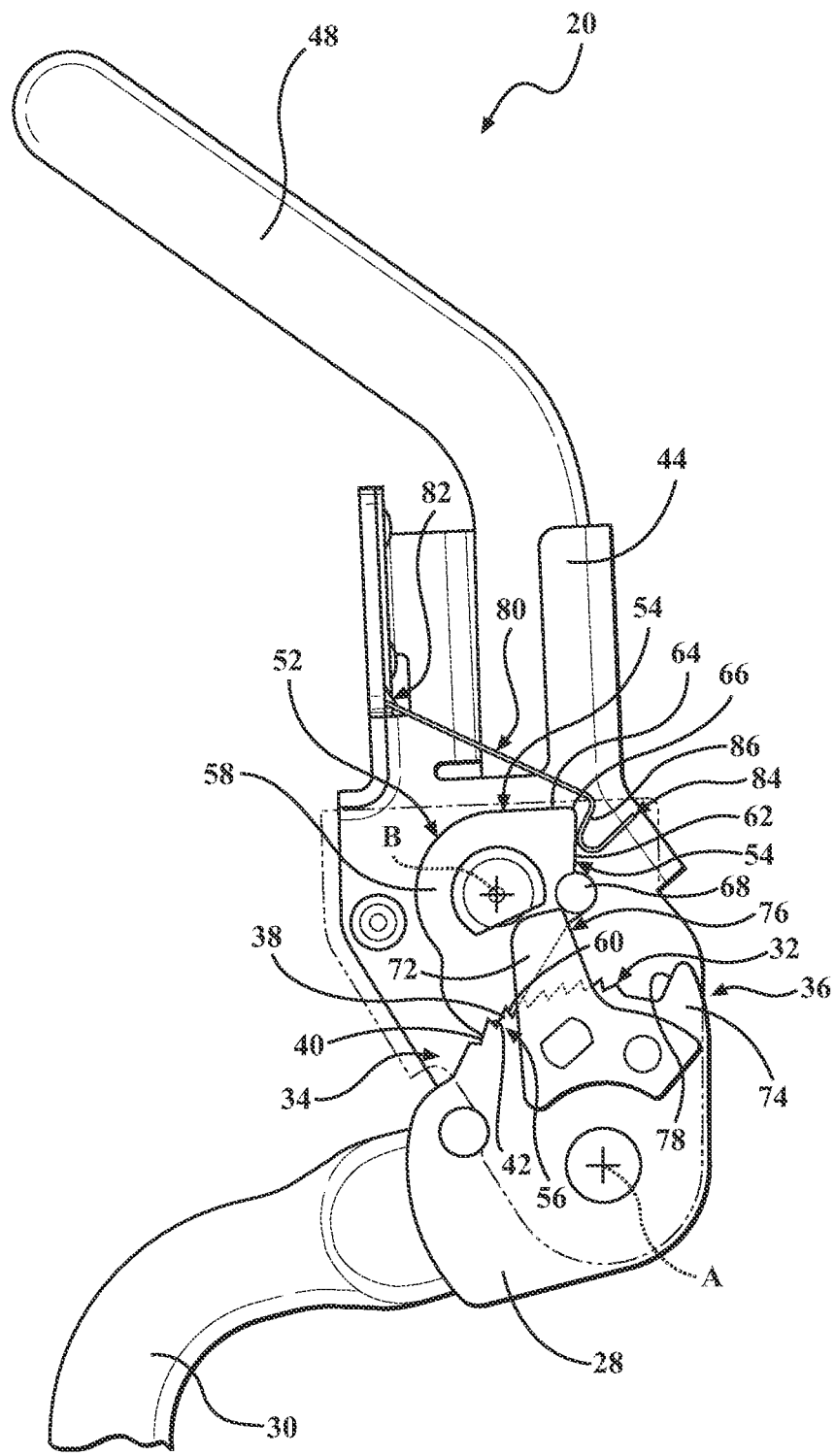
FIG. 5 is a side plan view of the headrest assembly including a movable bracket, a pawl, and a biasing member with the movable bracket in a first position and the pawl biased by the biasing member in an engaged position.
Figure 13:
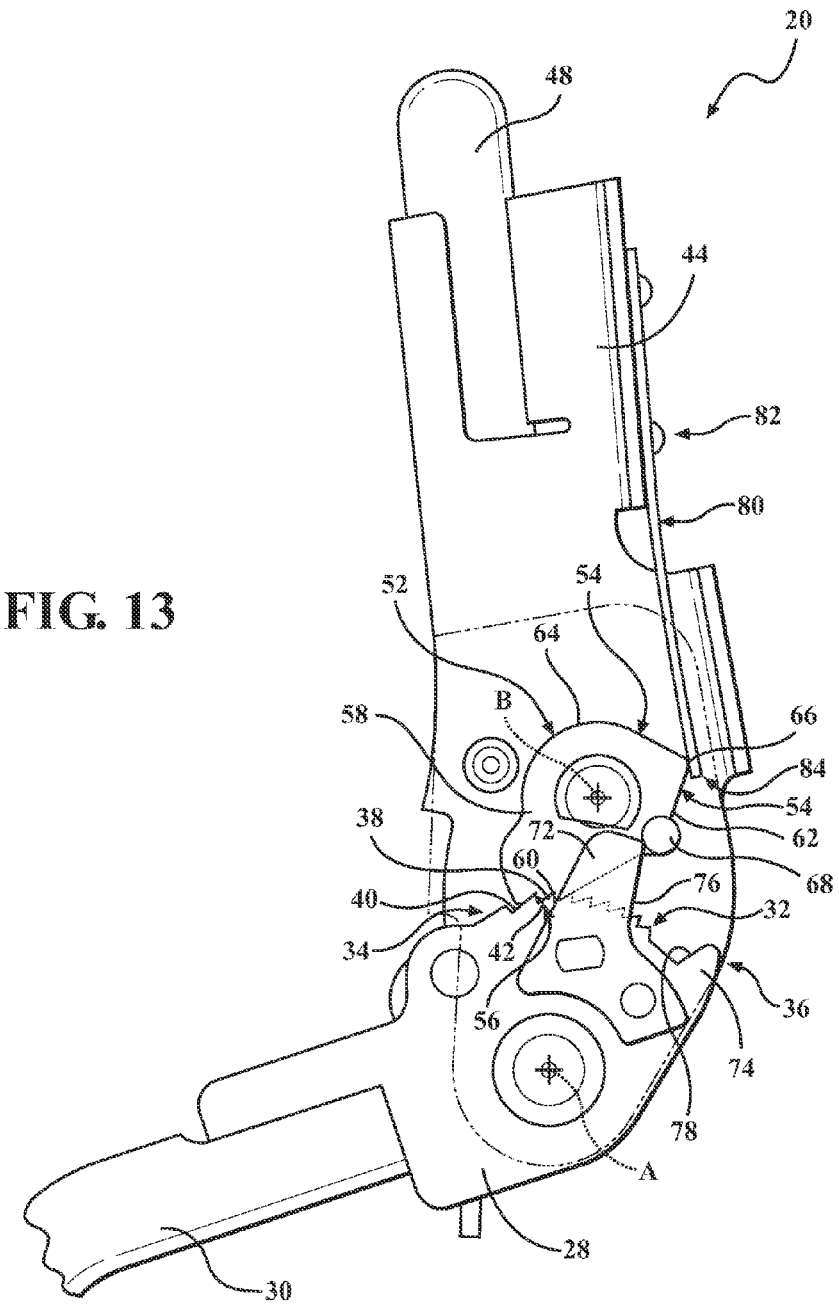
FIG. 13 is a side plan view of the headrest assembly including a movable bracket, a pawl, and a biasing member with the movable bracket in a first position and the pawl biased by the biasing member in an engaged position.

As shown in FIGS. 5 and 13, the first engagement section 32 may be further defined as at least one first tooth 38. More specifically, the at least one first tooth 38 may be further defined as a plurality of first teeth 38 extending between the first and second ends 34, 36. More specifically, the first teeth 38 are linearly aligned end-to-end between the first and second ends 34, 36. Each of the first teeth 38 angularly extend outwardly and toward the second end 36. More specifically, the at least one first tooth 38 has a transition surface 40. Even more specifically, each of the plurality of first teeth 38 has the transition surface 40. Furthermore, each of the plurality of first teeth 38 has an engagement surface 42. The transition surface 40 faces substantially away from the support bracket 28 and the engagement surface 42 substantially faces the support bracket 28. The configuration of the transition and engagement surfaces 40, 42 will be better understood through further description below.

The headrest assembly 20 includes a moveable bracket 44 coupled to the support bracket 28 for movement between a first position and a second position. More specifically, the movable bracket may be a pair of movable brackets with each movable bracket independently coupled to the pair of support brackets 28. Said differently, one of the pair of movable brackets is coupled to one of the pair of support brackets 28 and the other one of the pair of movable brackets is coupled to the other one of the pair of support brackets 28.

The moveable bracket 44 may pivot about a first axis A. The headrest assembly 20 includes a pin 46 extending between the pair of support brackets 28 and the pair of movable brackets along the first axis A. The pin 46 couples the respective support and movable brackets to one another and facilitates pivoting of the movable bracket about the first axis A. It is to be appreciated that the support bracket 28 and the movable bracket may be coupled to one another in any way. Furthermore, the moveable bracket 44 may pivot about the first axis A in any configuration.

As shown in FIGS. 4 and 12, the headrest may further include a headrest frame 48 coupled to each of the pair of movable brackets. More specifically, the headrest frame 48 has a pair of ends with one of the ends coupled to one of the pair of movable brackets and the other one of the ends coupled to the other one of the pair of movable brackets. The headrest frame 48 may have a substantially "U" configuration between the pair of ends with the headrest frame 48 extending away from the pair of movable brackets between the ends. It is to be appreciated that the headrest frame 48 may be coupled to the movable brackets in any suitable configuration. It is further to be appreciated that the headrest frame 48 may have any suitable shape or configuration.

The headrest may further include a cushion 50 coupled to the headrest frame 48. The cushion 50 substantially covers the support brackets 28, the movable brackets, and the headrest frame 48. The cushion 50 provides a comfortable surface for supporting the head of the user. It is to be appreciated that the headrest frame 48 may have any suitable shape or configuration for substantially covering at least the support brackets 28, the movable brackets, and the headrest frame 48.

As described above, the moveable brackets 44 are capable of moving between the first and second positions. More specifically, the movable brackets, the headrest frame 48, and the cushion 50 pivot about the first axis A between the first and second positions. The first and second positions may be any position of the movable bracket relative to the support bracket 28. Exemplary positions of the first and second positions will be described in greater detail below.

The pivoting of the movable brackets, the headrest frame 48, and the cushion 50 about the first axis A facilitates positioning the cushion 50 to best support the user's head. Said differently, the pivoting of the movable brackets, the headrest frame 48, and the cushion 50 allow the user to adjust the cushion 50 to a position which best supports the user's head.

As shown in FIGS. 5 and 13, the headrest assembly 20 includes a pawl 52 pivotally coupled to the moveable bracket 44 and defining a cam surface 54. More specifically, the pawl 52 may pivot about a second axis B. The pawl 52 has a second engagement section 56 and is pivotable between an engaged position with the second engagement section 56 engaging the first engagement section 32 for securing the moveable bracket 44 to the support bracket 28 in the first position and a disengaged position with the second engagement section 56 spaced from the first engagement section 32 for permitting movement of the moveable bracket 44 relative to the support bracket 28 between the first and second positions. The pawl 52 may be a single pawl 52 having a single second engagement section 56 selectively engaging the single first engagement section 32 disposed along the one of the pair of support brackets 28. It is to be appreciated that the pawl 52 may be a pair of pawls 52 spaced from each other and adjacent to the pair of support brackets 28 with each pawl 52 having the second engagement section 56 configured to independently selectively engage the first engagement section 32 of each pawl's 52 respective support bracket 28, as described in the alternative configuration above.

Figure 3:
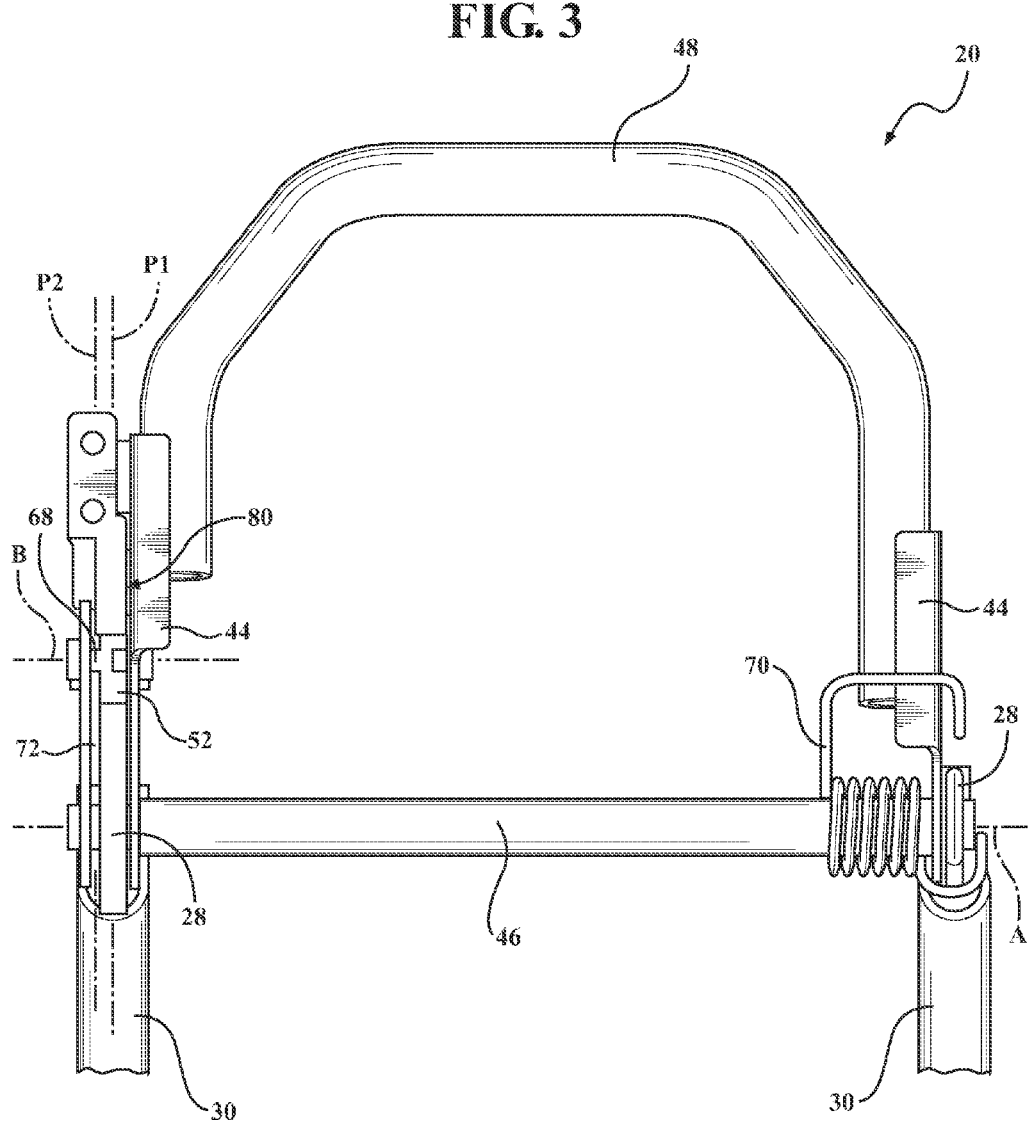
FIG. 3 is a front elevational view of the headrest assembly coupled to the frame.
Figure 11:
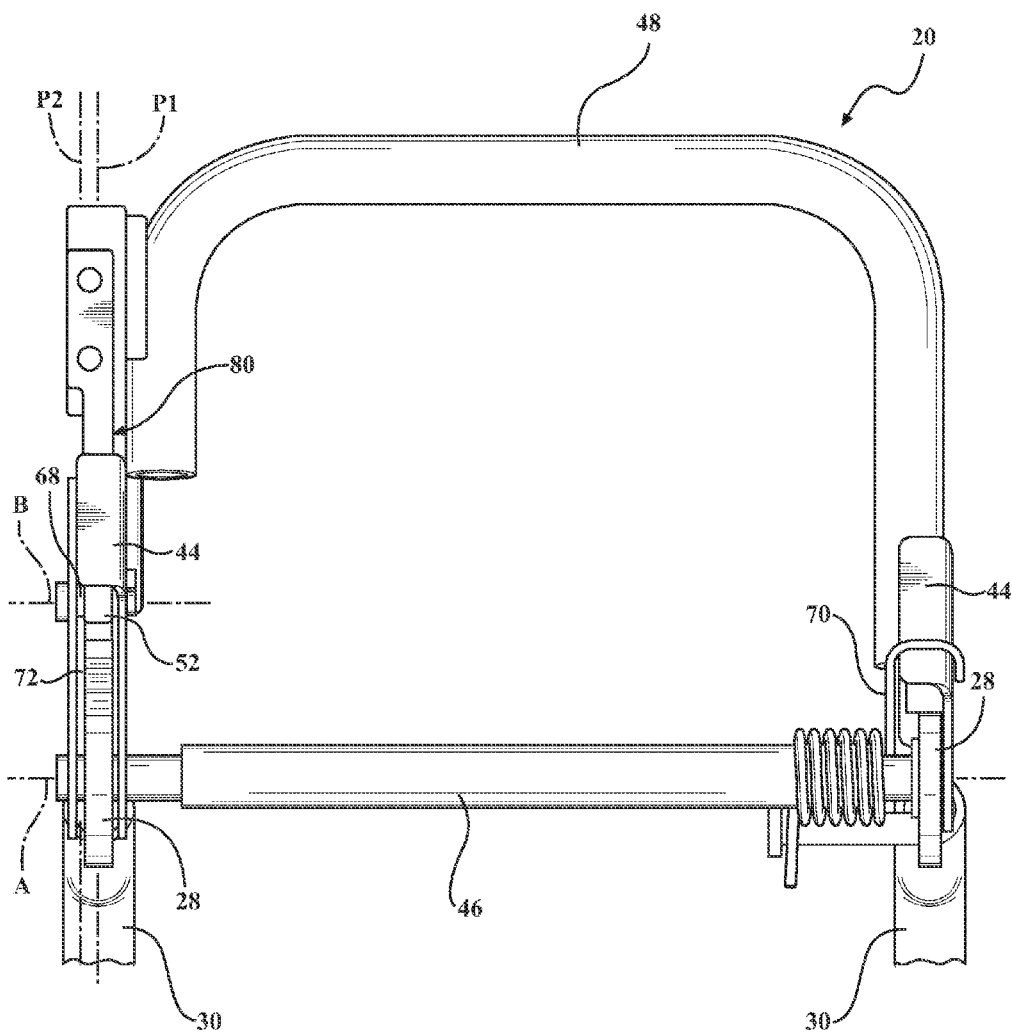
FIG. 11 is a front elevational view of the headrest assembly coupled to the frame.

As shown in FIGS. 3 and 11, the first engagement section 32 of the support bracket 28 and the second engagement section 56 of the pawl 52 may be disposed in a first plane P1. The first and second axes A, B are offset and parallel to one another to facilitate selective engagement of the second engagement section 56 with the first engagement section 32. The offset and parallel configuration of first and second axes A, B facilitates independent movement of the movable brackets about the first axis A and the pawl 52 about the second axis B. Furthermore, the disposition of the first and second engagement sections 32, 56 along the first plane P1 facilitates engagement of the second engagement section 56 with the first engagement section 32 as the movable brackets and the and the pawl 52 independently pivot about the first and second axes A, B, respectively.

As shown in FIGS. 5 and 13, the second engagement section 56 of the pawl 52 may be spaced from the second axis B with the second engagement section 56 rotatable about the second axis B toward and away from the support bracket 28 to facilitate selective engagement of the second engagement section 56 with the first engagement section 32. More specifically, the pawl 52 may have a body 58 with the body 58 pivotally coupled to the movable bracket at the second axis B with the body 58 extending from the second axis B to a distal end. The second engagement section 56 is disposed along the body 58 at the distal end. Said differently, the body 58 has an oblong configuration between the second axis B and the distal end. The oblong configuration of the body 58 extending from the second axis B to the distal end facilitates rotation of the body 58 about the second axis B and limits engagement of the second engagement section 56 with first engagement section 32 to only when the distal end is adjacent to the support bracket 28.

Figure 14:
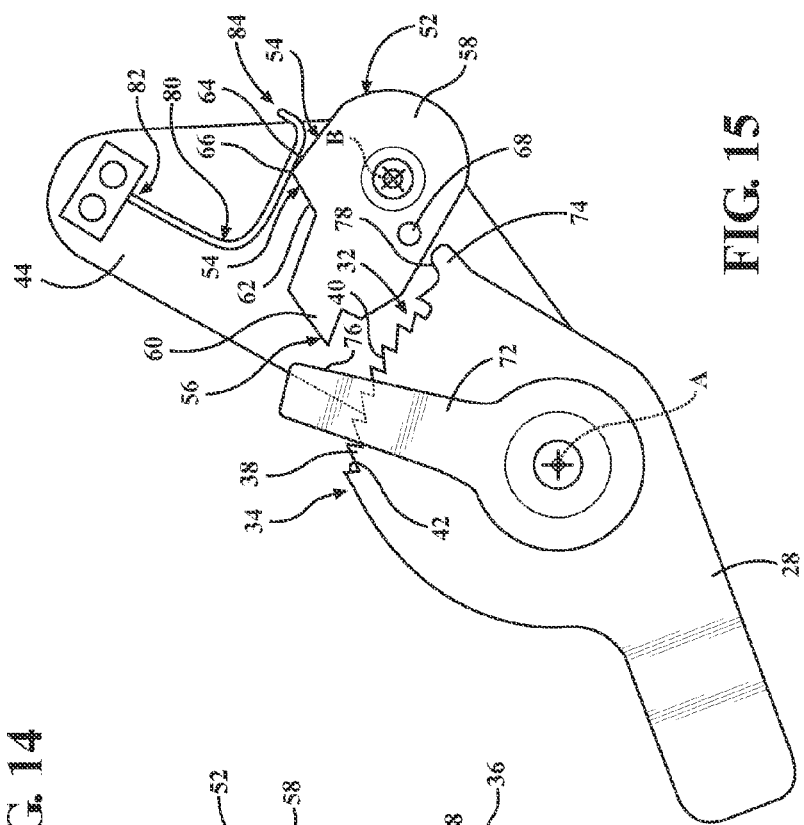
FIG. 14 is a side plan view of another embodiment of a headrest assembly including a first tab, a movable bracket, a pawl, and a biasing member with the movable bracket pivoting toward a first position and the pawl engaging the first tab and pivoting toward an engaged position against the bias of the biasing member.
Figure 15:
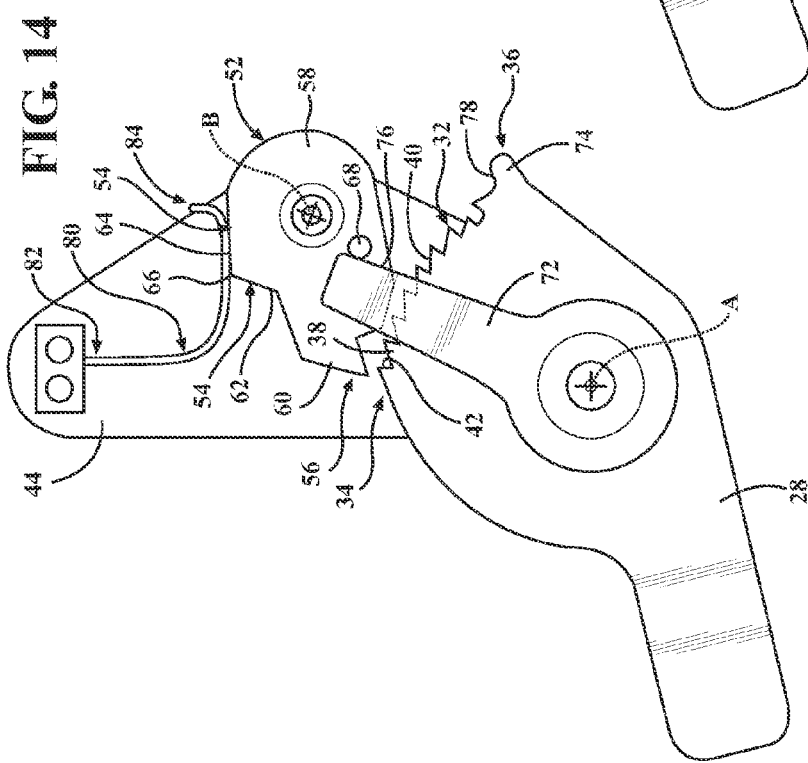
FIG. 15 is a side plan view of the headrest assembly including the movable bracket, the pawl, and the biasing member with the movable bracket in a second position and the pawl biased by the biasing member in a disengaged position.

The second engagement section 56 is further defined as at least one second tooth 60. The at least one second tooth 60 may be further defined as a plurality of second teeth 60 as shown in FIGS. 5 and 13. The plurality of second teeth 60 are linearly aligned end-to-end along the body 58. Alternatively, the at least one second tooth 60 may be a single tooth as shown in FIGS. 14 and 15. It is to be appreciated that the at least one second tooth 60 may be any number of teeth.

As shown in FIGS. 5 and 13, the at least one second tooth 60 extends away from the body 58. The first and second engagement sections 32, 56 may have opposing configurations with the first engagement section 32 retaining the pawl 52 in the engaged position when the moveable bracket 44 is in the first position. Said differently, the at least one second tooth 60 extends substantially toward the first end 34 of the first engagement section 32 when the pawl 52 is in the engaged position. The at least one second tooth 60 engages the engagement surface 42 of the at least one first tooth 38. The configuration of the engagement surface 42 substantially facing the support bracket 28 inhibits the pivoting of the pawl 52 toward the disengaged position and retains the pawl 52 in the engaged position.

The first position may be further defined as the position of the movable bracket relative to the support bracket 28 when the second engagement section 56 engages the first engagement section 32 in the engaged position and the first engagement section 32 retains the pawl 52 in the engaged position, as generally shown in FIGS. 5 and 13. As described above, the first engagement section 32 may be the plurality of first teeth 38. The at least one second tooth 60 of the pawl 52 may engage and be retained by any of the plurality of first teeth 38 when the pawl 52 is in the engaged position. Therefore, the first position may be any position of the movable bracket relative to the support bracket 28 with the at least one second tooth 60 engaging and retained by any of the plurality of first teeth 38.

Figure 6:
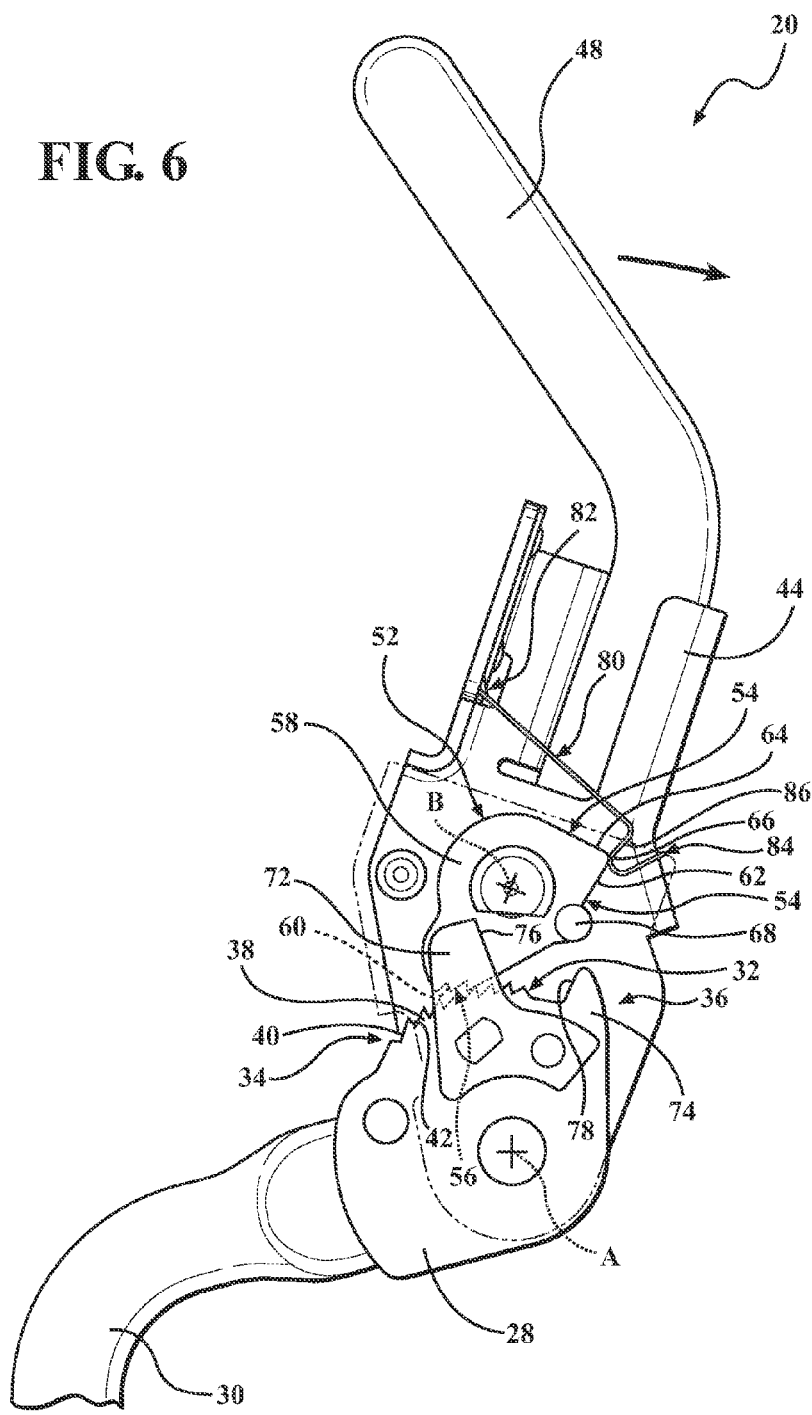
FIG. 6 is a side plan view of the headrest assembly including a first engagement section, the movable bracket, the pawl, and the biasing member with the movable bracket pivoting toward a second position and the pawl biased by the biasing member in the engaged position and sliding along the first engagement section.

The at least one second tooth 60 may be slidable along the transition surface 40 as the movable bracket moves from the first position to the second position, as shown in FIG. 6. As described above, the transition surface 40 faces substantially away from the support bracket 28. Furthermore, the at least one first tooth 38 extends outwardly from the support bracket 28 and toward the second end 36 of the first engagement section 32. As such, as the movable bracket pivots about the first axis A toward the second end 36 of the first engagement section 32, the at least one second tooth 60 of the second engagement section 56 of the pawls 52 slides along the transition surface 40 of each of the second teeth 60. When the movable bracket stops pivoting toward the second end 36, the at least one second tooth 60 engages and is retained by the engagement surface 42 of the at least one first tooth 38.

The cam surface 54 may have a first region 62 and a second region 64 adjacent to the first region 62. As shown in FIGS. 5 and 13, the first and second regions 62, 64 of the cam surface 54 may be disposed along the body 58 of the pawl 52 opposite the second engagement section 56 about the second axis B. Alternatively, as shown in FIG. 14, the first and second regions 62, 64 of the cam surface 54 may be disposed along the body 58 of the pawl 52 between the second engagement section 56 and the second axis B. It is to be appreciated that the first and second regions 62, 64 of the cam surface 54 may be disposed anywhere along the pawl 52.

As shown in FIGS. 5 and 13, the first and second regions 62, 64 abut to define a ridge 66. More specifically, the first and second regions 62, 64 of the cam have opposing angular configurations. The first and second regions 62, 64 abut at the ridge 66 and angle downwardly away from the ridge 66 in opposing directions. Said differently, the ridge 66 projects outwardly from the pawl 52. It is to be appreciated that the first and second regions 62, 64 may have any angular configuration along the pawl 52. The purpose of the ridge 66 and the first and second regions 62, 64 will be further described below.

The pawl 52 may have the body 58 and a projection 68 with the projection 68 extending from the body 58. The projection 68 may extend laterally from the first plane P1, as shown in FIGS. 3 and 11. The projection 68 may also be spaced from the second axis B and may be rotatable about the second axis B, as shown in FIGS. 5 and 13. It is to be appreciated that the projection 68 may extend from the body 58 in any suitable configuration. The purpose of the projection 68 will be further described below.

Figure 2:
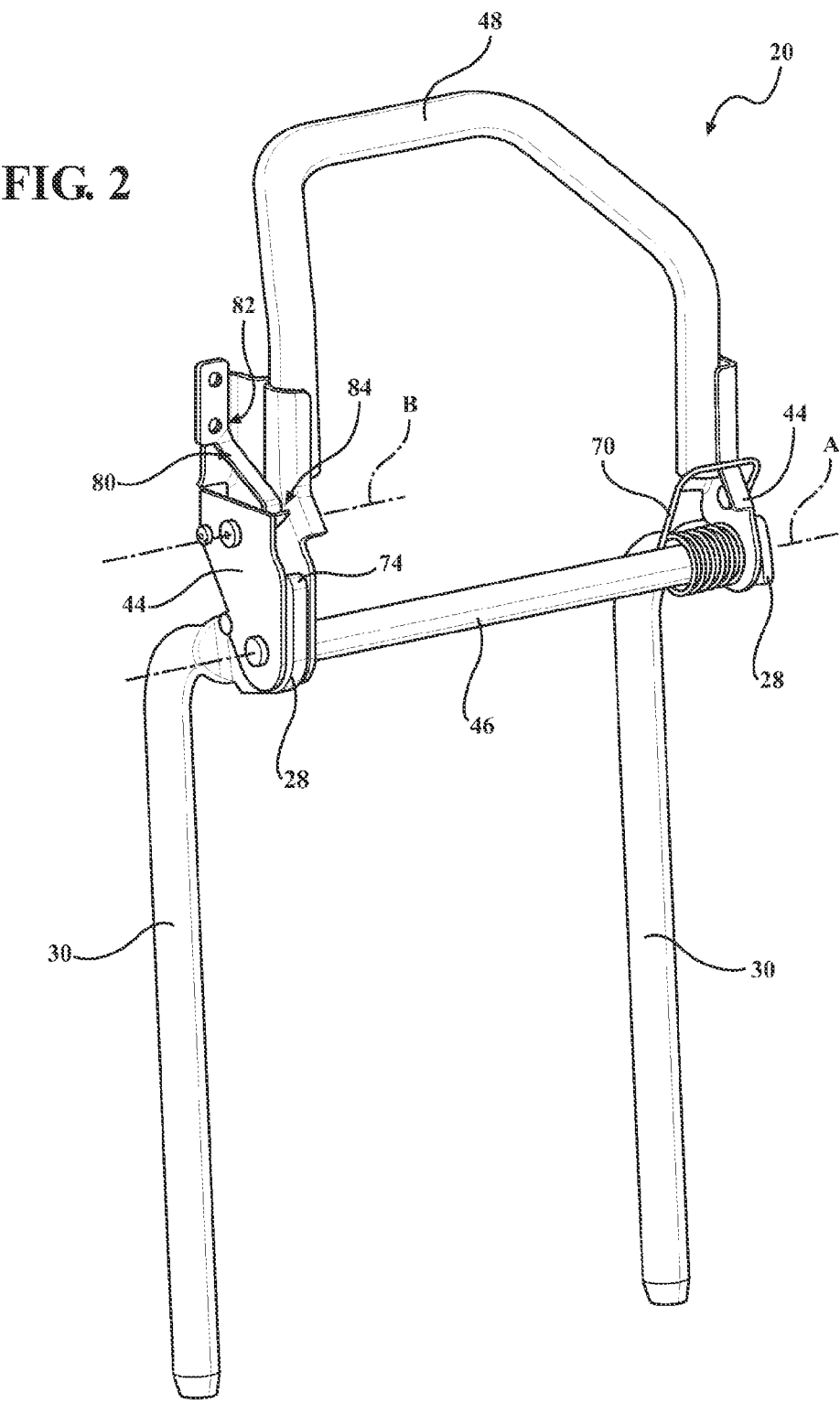
FIG. 2 is a perspective view of the headrest assembly coupled to a frame.
Figure 10:
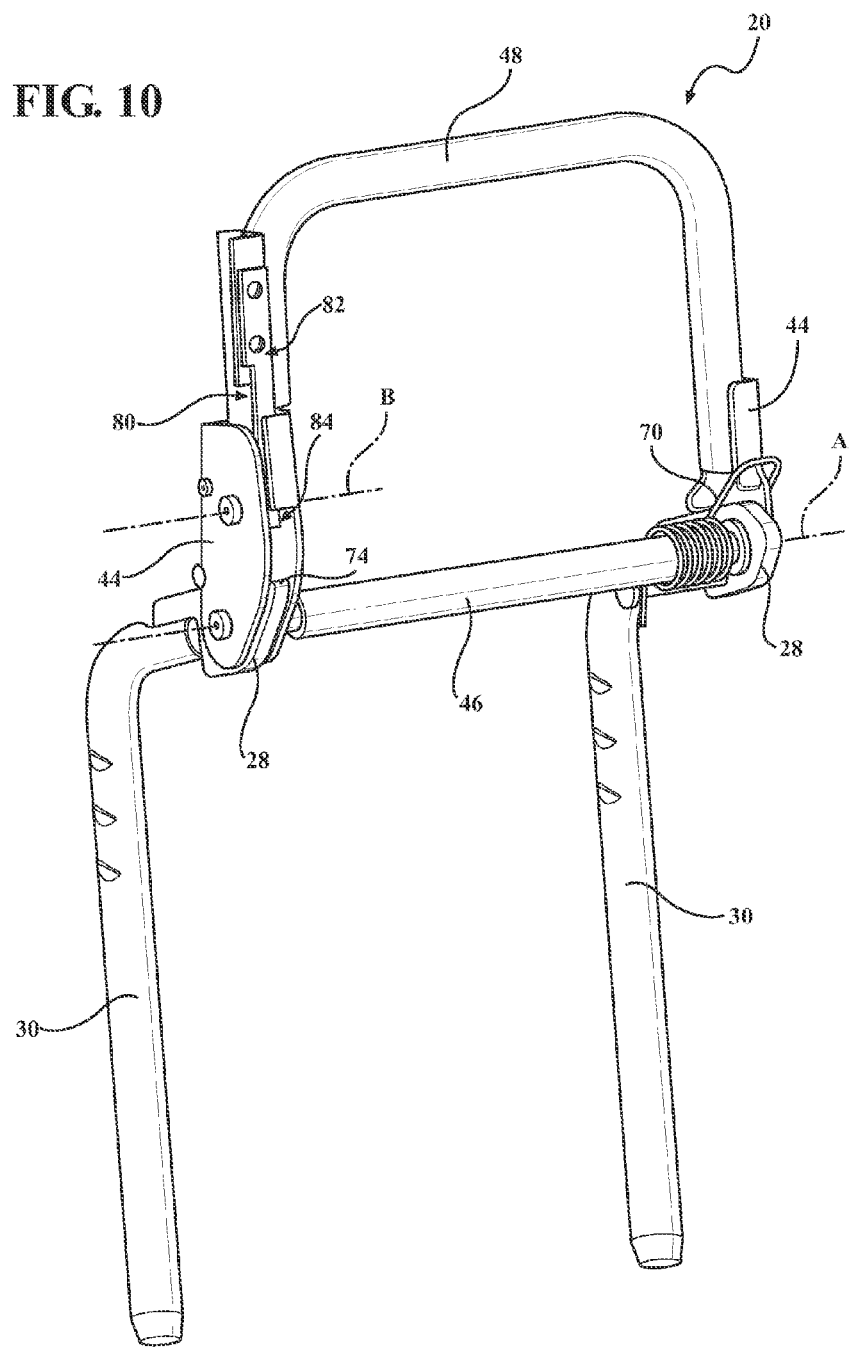
FIG. 10 is a perspective view of another embodiment of a headrest assembly coupled to the frame.

As shown in FIGS. 2 and 10, the headrest assembly 20 may further include a spring 70 engaging each of the movable bracket and the support bracket 28. The spring 70 may be fixed to each of the movable and support brackets 28. The spring 70 biases the movable bracket toward the first position and maintains engagement of the second engagement section 56 with the first engagement section 32 in the engaged position. Said differently, the spring 70 biases the movable bracket and the pawl 52 toward the first end 34 of the first engagement section 32. The at least one second tooth 60 is in turn biased into engagement with the engagement surface 42 of the at least one first tooth 38, with the engagement surface 42 retaining the pawl 52 in the engaged position.

Figure 7:
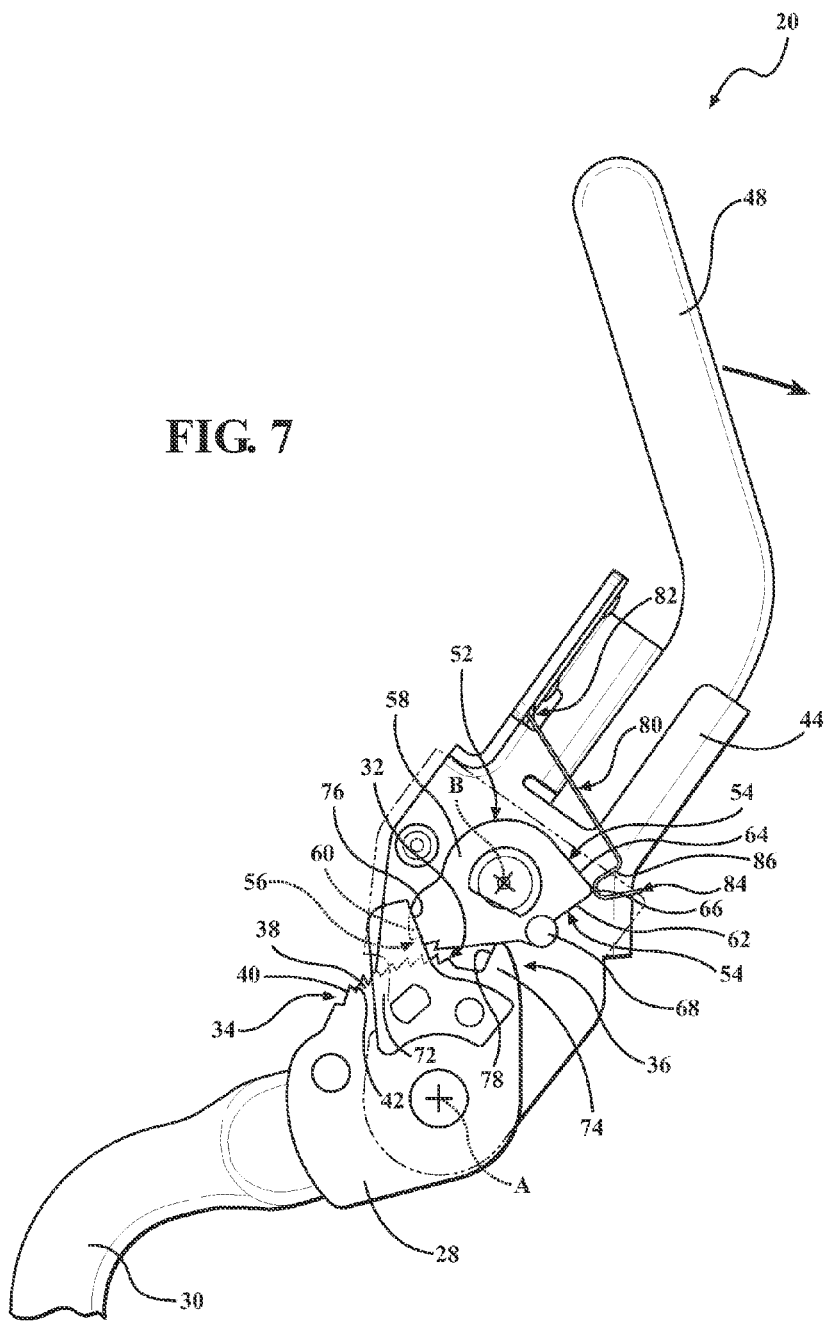
FIG. 7 is a side plan view of the headrest assembly including a second tab, the movable bracket, the pawl, and the biasing member with the movable bracket pivoting toward the second position and the pawl engaging the second tab and pivoting toward a disengaged position against the bias of the biasing member.
Figure 8:
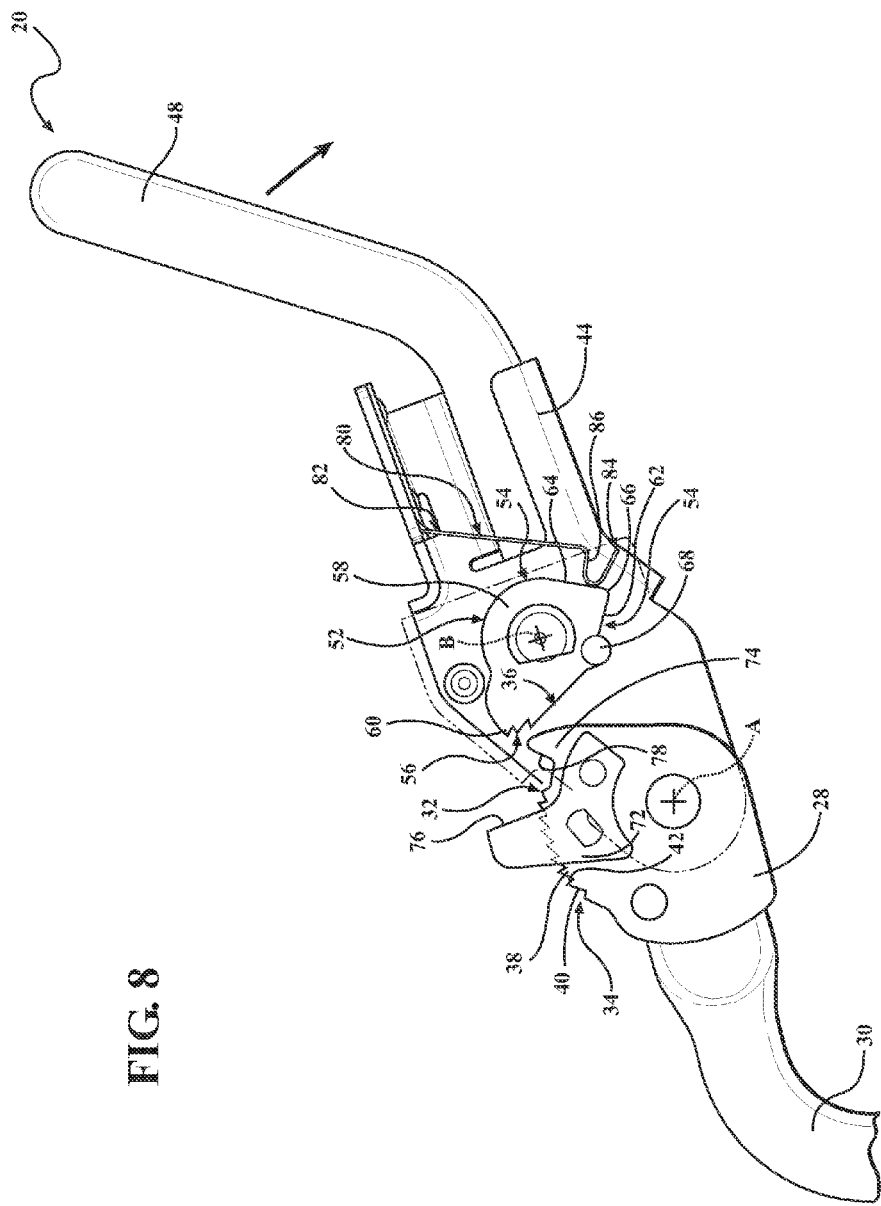
FIG. 8 is a side plan view of the headrest assembly including the movable bracket, the pawl, and the biasing member with the movable bracket in the second position and the pawl biased by the biasing member in the disengaged position.

As shown in FIGS. 5 and 13, the headrest assembly 20 includes a first tab 72 coupled to and fixed relative to the support bracket 28. Furthermore, the headrest assembly 20 includes a second tab 74 coupled to and fixed relative to the support bracket 28. The first tab 72 selectively engages and guides the pawl 52 into the engaged position as the moveable bracket 44 moves from the second position to the first position. The second tab 74 selectively engages and guides the pawl 52 into the disengaged position as the moveable bracket 44 moves from the first position to the second position. The second position may be further defined as any position of the movable bracket relative to the support bracket 28 where the second tab 74 selectively engages and guides the pawl 52 into the disengaged position, as illustrated by FIGS. 7 and 8.

At least one of the first and second tabs 72, 74 may be disposed between the first and second ends 34, 36 of the first engagement section 32 of the support bracket 28 to selectively engage and guide the pawl 52 into the respective engaged and disengaged positions. Furthermore, at least one of the first and second tabs 72, 74 may be disposed in a second plane P2 which is laterally offset from the first plane P1, as shown in FIGS. 3 and 11. Said differently, the second plane P2 is spaced from and substantially parallel to the first plane P1. The first tab 72 is disposed in the second plane P2 and the second tab 74 is disposed in the first plane P1. It is to be appreciated that the first and second tabs 72, 74 may be disposed in either of the first and second planes P1, P2.

As shown in FIGS. 5 and 13, the second tab 74 may be disposed at the second end 36 of the first engagement section 32 for guiding pivoting of the pawl 52 into the disengaged position. Said differently, the second tab 74 is disposed within the first plane P1 at the second end 36 of the first engagement section 32. The second tab 74 may be integrally formed with the support bracket 28 as a unit. It is to be appreciated that the second tab 74 may be a separate and distinct component fixed to the support bracket 28 by any fastening means, including but not limited to welding, mechanical fasteners, and chemical bonding.

The first tab 72 may be spaced from the second tab 74 and disposed toward the first end 34 of the first engagement section 32. Said differently, the first tab 72 is disposed in the second plane P2 and is spaced from the second tab 74 toward the first end 34 of the first engagement section 32. It is to be appreciated that the first tab 72 may be disposed at the first end 34 of the first engagement section 32. It is also to be appreciated that the first tab 72 may be disposed anywhere along the first engagement section 32 or in any suitable configuration.

The first tab 72 may be a separate and distinct component fixed to the support bracket 28 by any fastening means, including but not limited to welding, mechanical fasteners, and chemical bonding. It is to be appreciated that the first tab 72 may be integrally formed with the support bracket 28 as a unit.

Figure 9:
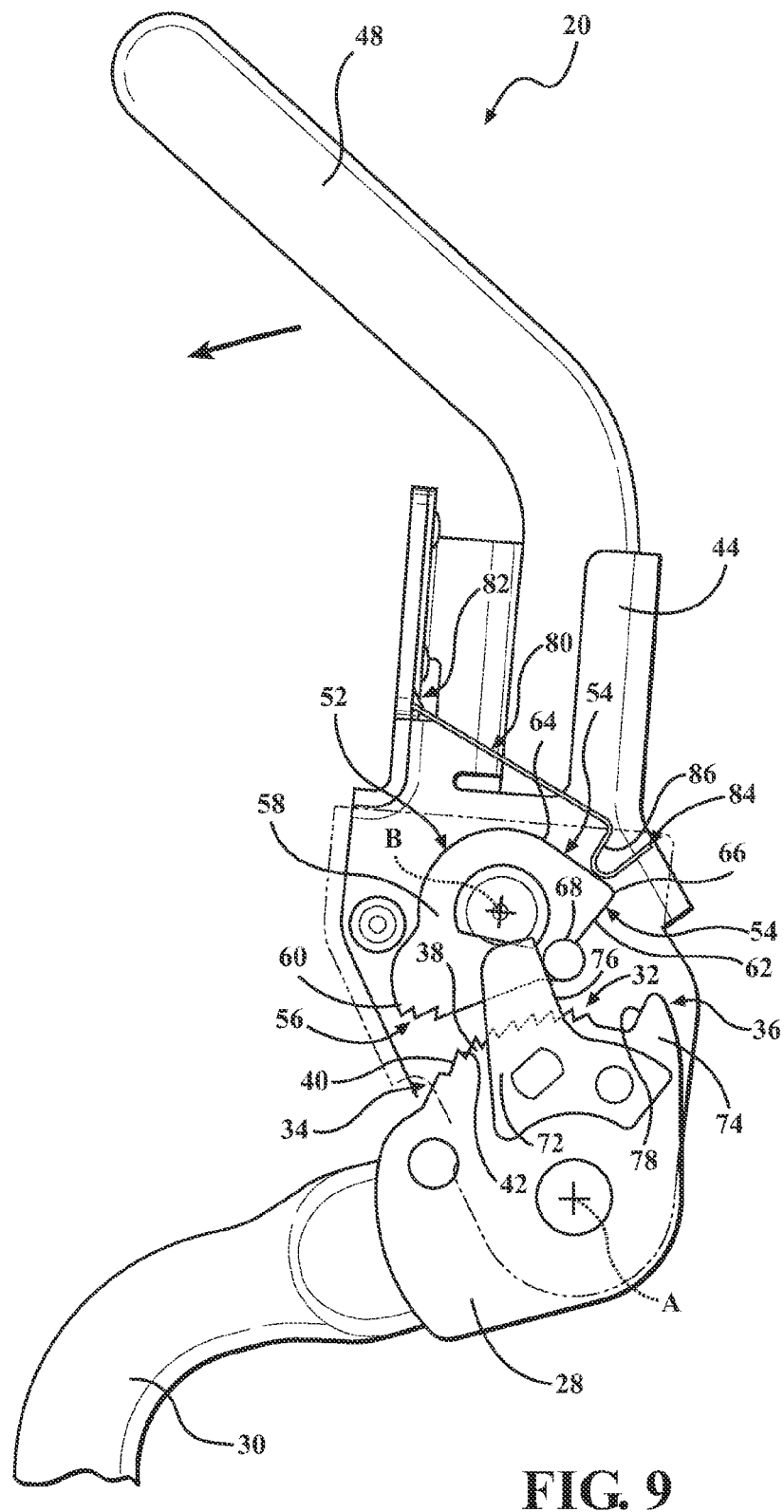
FIG. 9 is a side plan view of the headrest assembly including a first tab, the movable bracket, the pawl, and the biasing member with the movable bracket pivoting toward the first position and the pawl engaging the first tab and pivoting toward the engaged position against the bias of the biasing member.

The projection 68 may be adapted to selectively engage at least one of the first and second tabs 72, 74 and guide the pawl 52 into the respective engaged and disengaged positions, as illustrated by FIG. 9. More specifically, the projection 68 extends from the body 58 to selectively engage at least one of the first and second tabs 72, 74. As described above, the first tab 72 is disposed in the second plane P2. The projection 68 extends from the first plane P1 toward the second plane P2 with the projection 68 selectively engaging the first tab 72 and with the engagement of the projection 68 with the first tab 72 guiding the pawl 52 into the engaged position. It is to be appreciated that if the second tab 74 is disposed in the second plane P2 as alternatively described above, the projection 68 would selectively engage the second tab 74, with the engagement of the projection 68 with the second tab 74 guiding the pawl 52 into the disengaged position.

The first tab 72 may have a first abutment surface 76 and the second tab 74 may have a second abutment surface 76 with the pawl 52 selectively engaging and sliding along the first and second abutment surfaces 74, 76 and pivoting into the respective engaged and disengaged positions. The first and second abutment surfaces 74, 76 face one another. The first and second abutment surfaces 74, 76 have an angular configuration with the first and second abutment surfaces 74, 76 extending transverse to the first engagement section 32. The first and second abutment surfaces 74, 76 are at least partially disposed above the at least one first tooth 38 of the first engagement section 32.

With the pawl 52 in the disengaged position, as shown in FIG. 8, the movable bracket may pivot about the first axis A toward the first end 34 of the first engagement section 32. The projection 68 engages and slides down the angularly configured first abutment surface 76 of the first tab 72 toward the first engagement section 32, as shown in FIG. 9. The pawl 52 concurrently rotates about the second axis B toward the first engagement section 32 as the projection 68 slides down the first abutment surface 76. The at least one second tooth 60 of the second engagement section 56 engages the engagement surface 42 of one of the plurality of first teeth 38 which is disposed at the first end 34 of the first engagement section 32, as shown in FIGS. 5 and 13. The pawl 52 is disposed in the engaged position and the movable bracket is disposed in the first position.

With the pawl 52 in the engaged position, the movable bracket may pivot about the first axis A toward the second end 36 of the first engagement section 32 with the at least one second tooth 60 sliding along the transition surface 40 of each of the plurality of first teeth 38, as shown in FIG. 6. The body 58 of the pawl 52 engages and slides up the angularly configured second abutment surface 76 of the second tab 74 away from the first engagement section 32, as shown in FIG. 7. More specifically, the pawl 52 rotates about the second axis B away from the first engagement section 32 as the body 58 slides up the second abutment surface 76. The second engagement section 56 of the pawl 52 disengages the first engagement section 32 of the support bracket 28. The pawl 52 is disposed in the disengaged position and the movable bracket is disposed in the second position, as shown in FIG. 8.

As shown in FIGS. 5, 13, and 14, the headrest assembly 20 includes a biasing member 80 coupled to the moveable bracket 44 and engaging the cam surface 54 of the pawl 52 to continuously bias the pawl 52 into both of the engaged and disengaged positions. The biasing member 80 may have a proximal end 82 coupled to the moveable bracket 44 and may extend to a distal end 84 spaced from the proximal end 82 with the biasing member 80 engaging the cam surface 54 of the pawl 52 between the proximal and distal ends 82, 84. More specifically, the biasing member 80 may have a substantially linear configuration between the proximal and distal ends 82, 84 with the biasing member 80 engaging the cam surface 54 of the pawl 52 substantially at the distal end 84, as shown in FIGS. 5 and 13. As shown in FIG. 5, the biasing member 80 may have a hook 86 disposed at the distal end 84. The hook 86 extends to the engage the cam surface 54 disposed on the body 58 of the pawl 52 opposing the first engagement section 32 about the second axis B as described above. Alternatively, as shown in FIG. 13, the linearly configured may lie against and engage the cam surface 54 at the distal end 84.

Alternatively, the biasing member 80 may have an arcuate configuration between the proximal and distal ends 82, 84 as shown in FIG. 14, with the biasing member 80 slidably engaging the cam surface 54 of the pawl 52 along the biasing member 80 between the proximal and distal ends 82, 84. More specifically, the biasing member 80 engages the cam surface 54 disposed on the body 58 of the pawl 52 between the first engagement section 32 and the second axis B as described above.

The biasing member 80 may be further defined as a single biasing member 80 providing a singular biasing force acting on the pawl 52 with the singular biasing force biasing the pawl 52 into both of the engaged and disengaged positions. More specifically, the distal end 84 of the biasing member 80 flexes about the proximal end 82 of the biasing member 80 such that the singular biasing force is exhibited rotationally on the pawl 52. It is to be appreciated that the singular biasing force may be rotational, translational, or in any other configuration for biasing against the pawl 52.

The biasing member 80 continuously biases the pawl 52 into the engaged position when the biasing member 80 abuts the first region 62, as generally illustrated by FIG. 5, and the biasing member 80 continuously biases the pawl 52 into the disengaged position when the biasing member 80 abuts the second region 64, as generally illustrated by FIG. 8. As described above, the first and second regions 62, 64 of the cam have opposing angular configurations. When the pawl 52 is in the engaged position, the biasing member 80 engages the first region 62 of the cam surface 54, as shown in FIG. 5. The angular configuration of the first region 62 facilitates the singular biasing force biasing the pawl 52 rotationally about the second axis B such that the second engagement section 56 is rotated toward the first engagement section 32. The singular biasing force exerted by the biasing member 80 facilitates continual engagement of the second engagement section 56 with the first engagement section 32 in the engaged position.

When the pawl 52 is in the disengaged position, the biasing member 80 engages the second region 64 of the cam surface 54, as shown in FIG. 8. The angular configuration of the second region 64 facilitates the singular biasing force biasing the pawl 52 rotationally about the second axis B such that the second engagement section 56 is rotated away from the first engagement section 32. The singular biasing force exerted by the biasing member 80 facilitates continual spacing of the second engagement section 56 from the first engagement section 32 in the disengaged position.

The bias of the biasing member 80 may be overcome by rotation of the pawl 52 toward or away from the first engagement section 32 when the pawl 52 engages either one of the first and second tabs 72, 74. The biasing member 80 may continuously abut and slide along the cam surface 54 of the pawl 52 as the pawl 52 pivots between the engaged and disengaged positions. The biasing member 80 slides over the ridge 66 as the pawl 52 pivots between the engaged and disengaged position, as illustrated between FIGS. 6-8. The biasing member 80 continuously biases the pawl 52 with the singular biasing force along the entirety of the first and second regions 62, 64 with the ridge 66 defining the transition between the first and second regions 62, 64. Said differently, the rotation of the pawl 52 about the second axis B as a result of the bias by the biasing member 80 changes as the biasing member 80 passes over the ridge 66.

The operation of pivoting the movable brackets, the headrest frame 48, the cushion 50, and the pawl 52 about the first axis A to the first position and concurrently pivoting the pawl 52 about the second axis B into the engaged position for supporting the user's head will be discussed below for illustrative purposes only. In addition, the operation of pivoting the movable brackets, the headrest frame 48, the cushion 50, and the pawl 52 about the first axis A to the second position and concurrently pivoting the pawl 52 into the disengaged position for facilitating adjustment of the movable brackets, the headrest frame 48, the cushion 50, and the pawl 52 to a position which the user desires will be discussed below for illustrative purposes only.

As generally illustrated in FIG. 8, with the pawl 52 in the disengaged position and the biasing member 80 engaging and biasing the second region 64 of the cam surface 54 to retain the pawl 52 in the disengaged position, the user pivots the moveable brackets 44, the headrest frame 48, the cushion 50, and the pawl 52 toward the first end 34 of the first engagement section 32 about the first axis A. The projection 68 of the pawl 52 engages and slides down the angularly configured first abutment surface 76 of the first tab 72 toward the first engagement section 32, as generally illustrated in FIG. 9. The pawl 52 concurrently rotates about the second axis B toward the first engagement section 32 as the projection 68 slides down the first abutment surface 76. The biasing member 80 slides along the second region 64 toward the ridge 66. The at least one second tooth 60 of the second engagement section 56 engages the engagement surface 42 of one of the plurality of first teeth 38 which is disposed at the first end 34 of the first engagement section 32, as generally illustrated in FIG. 5. The biasing member 80 concurrently passes over the ridge 66 and engages the first region 62 of the cam surface 54. The pawl 52 is disposed in the engaged position and the biasing member 80 biases the first region 62 to retain the pawl 52 in the engaged position. The movable bracket is disposed in the first position. The spring 70 biases the movable bracket toward the first end 34 of the first engagement section 32 to maintain engagement of the at least one second tooth 60 with the engagement surface 42 of the one of the plurality of teeth. The moveable brackets 44, the headrest frame 48, the cushion 50, and the pawl 52 may be pivoted toward the second end 36 of the first engagement section 32 about the first axis A with the at least one second tooth 60 sliding along the transition surface 40 of each of the second teeth 60, as generally illustrated in FIG. 6. The user may selectively stop pivoting the moveable brackets 44, the headrest frame 48, the cushion 50, and the pawl 52 anywhere between the first and second ends 34, 36 of the first engagement section 32, with the at least one second tooth 60 engaging the engagement surface 42 an adjacent one of the plurality of first teeth 38 to retain the cushion 50 in a desired position to support the user's head.

As generally illustrated in FIG. 5, with the pawl 52 in the engaged position and the biasing member 80 engaging and biasing the first region 62 of the cam surface 54 to retain the pawl 52 in the engaged position, the user pivots the moveable brackets 44, the headrest frame 48, the cushion 50, and the pawl 52 toward the second end 36 of the first engagement section 32 about the first axis A. The at least one second tooth 60 slides along the transition surface 40 of each of the second teeth 60, as generally illustrated in FIG. 6. The body 58 of the pawl 52 engages and slides up the angularly configured second abutment surface 76 of the second tab 74 away from the first engagement section 32, as generally illustrated in FIG. 7. The pawl 52 concurrently rotates about the second axis B away from the first engagement section 32 as the body 58 slides up the second abutment surface 76. The biasing member 80 slides along the first region 62 toward the ridge 66. The at least one second tooth 60 of the second engagement section 56 disengages the first engagement section 32. The biasing member 80 concurrently passes over the ridge 66 and engages the second region 64 of the cam surface 54. The pawl 52 is disposed in the disengaged position and the biasing member 80 biases the second region 64 to retain the pawl 52 in the disengaged position, as generally illustrated in FIG. 8. The movable bracket is disposed in the second position. The moveable brackets 44, the headrest frame 48, the cushion 50, and the pawl 52 may be pivoted toward the first end 34 of the first engagement section 32 about the first axis A to facilitate adjustment of the movable brackets, the headrest frame 48, and the cushion 50 to a position which the user desires.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A headrest assembly for a vehicle seat comprising:
    a support bracket adapted to be mounted to the vehicle seat with said support bracket having a first engagement section defined between a first end and a second end;
    a moveable bracket coupled to said support bracket for movement between a first position and a second position;
    a pawl pivotally coupled to said moveable bracket and defining a cam surface with said pawl having a second engagement section and being pivotable between an engaged position with said second engagement section engaging said first engagement section for securing said moveable bracket to said support bracket in said first position and a disengaged position with said second engagement section spaced from said first engagement section for permitting movement of said moveable bracket relative to said support bracket between said first and second positions;
    a first tab coupled to and fixed relative to said support bracket with said first tab selectively engaging and guiding said pawl into said engaged position as said moveable bracket moves from said second position to said first position;
    a second tab coupled to and fixed relative to said support bracket with said second tab selectively engaging and guiding said pawl into said disengaged position as said moveable bracket moves from said first position to said second position; and
    a biasing member coupled to said moveable bracket and engaging said cam surface of said pawl to continuously bias said pawl into both of said engaged and disengaged positions.

2. A headrest assembly as set forth in claim 1 wherein said biasing member continuously abuts and slides along said cam surface of said pawl as said pawl pivots between said engaged and disengaged positions.

3. A headrest assembly as set forth in claim 1 wherein at least one of said first and second tabs is disposed between said first and second ends of said first engagement section of said support bracket to selectively engage and guide said pawl into said respective engaged and disengaged positions.

4. A headrest assembly as set forth in claim 1 wherein said cam surface has a first region and a second region adjacent to said first region, with said biasing member continuously biasing said pawl into said engaged position when said biasing member abuts said first region and said biasing member continuously biasing said pawl into said disengaged position when said biasing member abuts said second region.

5. A headrest assembly as set forth in claim 4 wherein said first and second regions abut to define a ridge with said biasing member sliding over said ridge as said pawl pivots between said engaged and disengaged position.

6. A headrest assembly as set forth in claim 1 further including a spring engaging each of said movable bracket and said support bracket with said spring biasing said movable bracket toward said first position and maintaining engagement of said second engagement section with said first engagement section in said engaged position.

7. A headrest assembly as set forth in claim 1 wherein said first engagement section of said support bracket and said second engagement section of said pawl are disposed in a first plane and at least one of said first and second tabs is disposed in a second plane which is laterally offset from said first plane.

8. A headrest assembly as set forth in claim 7 wherein said pawl defines a projection which extends laterally from said first plane and is adapted to selectively engage at least one of said first and second tabs and guide said pawl into said respective engaged and disengaged positions.

9. A headrest assembly as set forth in claim 1 wherein said second tab is disposed at said second end of said first engagement section for guiding pivoting of said pawl into said disengaged position.

10. A headrest assembly as set forth in claim 9 wherein said first tab is spaced from said second tab and disposed toward said first end of said first engagement section.

11. A headrest assembly as set forth in claim 1 wherein said first and second engagement sections have opposing configurations with said first engagement section retaining said pawl in said engaged position when said moveable bracket is in said first position.

12. A headrest assembly as set forth in claim 1 wherein said first engagement section is further defined as at least one first tooth and said second engagement section is further defined as at least one second tooth.

13. A headrest assembly as set forth in claim 12 wherein said at least one first tooth has a transition surface with said at least one second tooth slidable along said transition surface as said movable bracket moves from said first position to said second position.

14. A headrest assembly as set forth in claim 1 wherein said moveable bracket pivots about a first axis and said pawl pivots about a second axis with said first and second axes offset and parallel to one another to facilitate selective engagement of said second engagement section with said first engagement section.

15. A headrest assembly as set forth in claim 14 wherein said pawl defines a projection spaced from said second axis and rotatable about said second axis with said projection adapted to selectively engage at least one of said first and second tabs and rotatably guide said pawl into said respective engaged and disengaged positions as said moveable bracket moves between said first and second positions.

16. A headrest assembly as set forth in claim 14 wherein said second engagement section of said pawl is spaced from said second axis with said second engagement section rotatable about said second axis toward and away from said support bracket to facilitate selective engagement of said second engagement section with said first engagement section.

17. A headrest assembly as set forth in claim 1 wherein said pawl has a body and a projection with said projection extending from said body to selectively engage at least one of said first and second tabs.

18. A headrest assembly as set forth in claim 1 wherein said first tab has a first abutment surface and said second tab has a second abutment surface with said pawl selectively engaging and sliding along said first and second abutment surfaces and pivoting into said respective engaged and disengaged positions.

19. A headrest assembly as set forth in claim 1 wherein said biasing member has a proximal end coupled to said moveable bracket and extends to a distal end spaced from said proximal end with said biasing member engaging said cam surface of said pawl between said proximal and distal ends.

20. A headrest assembly as set forth in claim 19 wherein said biasing member has a substantially linear configuration between said proximal and distal ends with said biasing member engaging said cam surface of said pawl substantially at said distal end.

21. A headrest assembly as set forth in claim 19 wherein said biasing member has a arcuate configuration between said proximal and distal ends with said biasing member slidably engaging said cam surface of said pawl along said biasing member between said proximal and distal ends.

22. A headrest assembly as set forth in claim 1 wherein said biasing member is further defined as a single biasing member providing a singular biasing force acting on said pawl with said singular biasing force biasing said pawl into both of said engaged and disengaged positions.

* * * * *